United States Patent [19]

Haraszti

[11] 3,740,576

[45] June 19, 1973

[54] DYNAMIC LOGIC INTERCONNECTION

[75] Inventor: Tegze Haraszti, Heilbornn, Germany

[73] Assignee: Licentia Patent-Verwaltungs GmbH, Frankfurt am Main, Germany

[22] Filed: Aug. 4, 1971

[21] Appl. No.: 168,966

[30] Foreign Application Priority Data

Aug. 4, 1970 Germany .................. P 20 38 633.8
Aug. 4, 1970 Germany .................. P 70 29 281.8

[52] U.S. Cl. ............... 307/205, 307/215, 307/218, 307/221 C, 307/304

[51] Int. Cl. .......................................... H03k 19/08

[58] Field of Search .................. 307/205, 215, 218, 307/221, 304, 221 C, 251, 279

[56] References Cited

UNITED STATES PATENTS

| | | | |
|---|---|---|---|
| 3,521,081 | 7/1970 | Vasseur et al. | 307/221 C |
| 3,502,909 | 3/1970 | Christensen et al. | 307/251 |
| 3,524,077 | 8/1970 | Kaufman | 307/221 C |
| 3,038,084 | 6/1962 | DeMiranda et al. | 307/221 R |
| 3,348,064 | 10/1967 | Powlus | 307/215 X |
| 3,360,736 | 12/1967 | Nagata | 307/304 X |
| 3,515,900 | 6/1970 | Smythe | 307/215 |
| 3,515,901 | 6/1970 | White | 307/215 |
| 3,518,454 | 6/1970 | French | 307/304 X |
| 3,518,584 | 6/1970 | Miller et al. | 307/304 X |

*Primary Examiner*—Stanley D. Miller, Jr.
*Attorney*—Spencer & Kaye

[57] ABSTRACT

A dynamic logic interconnection comprises a plurality of individual logic circuits connected in series, the individual logic circuits including a diode element in series with the controlled current path of an active circuit element, to which individual circuits single phase clock pulses are applied at the same time.

9 Claims, 6 Drawing Figures

DYNAMIC LOGIC INTERCONNECTION

BACKGROUND OF THE INVENTION

The invention relates to a dynamic logic interconnection, operated by clock pulses, consisting of a series circuit of logic individual circuits, the basic building block of which is an element operated as a diode and connected in series to the controlled current path of at least one active circuit element.

Compared with statically operated circuits, dynamically operated logic circuits are characterized particularly by their high switching speeds and the low power consumption. This is due particularly to the fact that dynamically operated circuits absorb power only during the recharging or charging of the storage capacitances associated with the active elements.

A basic building block of a diode connected in series to the controlled current path of an active element has already been proposed in a previous application. In such a logic interconnection which is operated with a phase clock pulse, the output data is continuously renewed by the periodically repeated phase clock pulse, so that it is maintained for a practically unlimited time. Obviously, the output data is conditioned by the data applied to the input of the logic circuit and by the type of circuit.

These disadvantages of the dynamically operated logic interconnection may realizing lost if a plurality of individual logic circuits either AND, OR or negating elements are connected in series. Such circuits have hitherto been operated with phase clock pulses which were shifted in time. The delay times of the individual circuits are added. This, it may happen for example, that the input value A is directly applied to an AND element, while the input value B is derived from upstream logical elements and reaches the AND element only with a certain delay. In this case, a delay circuit must be inserted between the input value A and the AND interconnection. If a plurality of phase clock pulses with different timing is used for the whole circuit, the output data can frequently be read out only after the end of the last phase clock pulse. Where the logic interconnection consists of several individual circuits, it may happen for these reasons that the dynamically operated circuit becomes slower than a statically operated circuit. The read-out phases becomes steadily smaller because, with the plurality of phase clock pulses offset in time, most time is lost for the phase clock pulses, and the reliable read-out is possible only between individual clock pulses. In this connection it must also be stressed that the spacing between phase clock pulses cannot have any length, because, between two phase clock pulses, the capacitances associated with the elements and charged by the clock pulses are again discharged through the high-ohmic paths of these elements, even with blocked diodes and transistors. It is, therefore, easy to understand that the advantages of known dynamic logic circuits are lost more and more with the number of used phase clock pulses and of individual circuits connected in series. The multiplicity of phase clock pulses also increases the expenditure for cell wiring because each circuit requires a corresponding number of clock wires.

SUMMARY OF THE INVENTION

According to the invention, there is provided a dynamic logic interconnection comprising a plurality of individual logic circuits connected in series, each of said individual logic circuits including a diode element and an active circuit element whose controlled current path is connected in series with said diode element, and means for applying a single phase clock pulse to said individual logic circuits at the same time.

BRIEF DESCRIPTION OF THE DRAWINGS

The invention will now be described in greater detail, by way of example, with reference to the accompanying drawings, in which.

DESCRIPTION OF THE PREFERRED EMBODIMENTS

Figure 1:
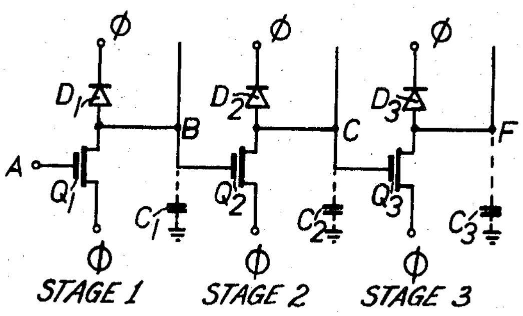
FIG. 1 shows the circuit diagram of a number of series connected inverter stages in accordance with the invention.

A dynamic logic interconnection operated by clock pulses consists of a series circuit of individual logic circuits the basic building block of which is an element operated as a diode connected in series with the controlled current path of at least one active surface element. The invention proposes to operate all individual circuits with a single phase clock pulse, which is applied at the same time to all individual circuits.

The logic interconnection according to the invention is characterized by a particularly high speed, even with complex arrangements, because only a single phase clock pulse is required and the result may be read out after the end of the phase clock pulse. Due to the minimum possible number of phase clock pulses, also the power consumption of the new logic interconnection can be extremely low. The incorporation of delay circuits is no longer necessary. The cell wiring can be very simple and the space requirements in a half body (half section) can be very small. The last two advantages are mainly due to the fact that, in a preferred embodiment of the logic circuit according to the invention, the diode of each building block is realized by a barrier layer junction between the semi-conductor substrate containing the circuit and the source or drain electrode, respectively, of the field effect transistor. In this case, it is possible to apply the phase clock pulses to the circuit through the substrate, so that special clock lines on the substrate are no longer necessary. Since the diode used is a part of the field effect transistor, the space necessary for the diode is saved. A complex logic circuit may, therefore, be built up by providing in a semi-conductor body a plurality of MOS field effect transistors, or other field effect transistors, and by circuiting and controlling the transistors in a suitable manner.

The operation of the logic interconnection according to the invention is based on the fact that, after the end of a phase clock pulse, the capacitances of the individual logic circuits are not discharged equally and quickly and, also, a time constant difference exists between the individual stages, which is caused by the non-linearity of the forword resistance of the field effect transistors. This difference is a function of the transistor input voltage.

In a preferred embodiment of the logic circuit according to the invention, the basic building block consists of a diode, mounted in series with the controlled current path of a field effect transistor. Hence, the phase clock pulse is applied both to the free electrode of the field effect transistor, and to the free electrode of the diode. In another embodiment, the phase clock pulse is applied only to the free electrode of the diode, while the free electrode of the field effect transistor is connected to ground. The input data is preferably applied to the control electrode of the field effect transistor. Several individual units containing the basic building block are so connected in series that the connection between the diode and the field effect transistor of an individual circuit is connected to the control electrode of a field effect transistor in the next circuit.

The field effect transistors used are preferably MOS field effect transistors with a control electrode which is separated from the semi-conductor substrate by an oxide layer. The oxide layer may also be replaced by other insulating layers.

For realizing an AND connection or a negated AND connection, the controlled current paths of several field effect transistors are connected in series. The input data to be interlinked are applied to the control electrodes of the field effect transistors.

For realizing OR or negated OR connections, the controlled current paths of several field effect transistors are connected in parallel. The input data to be cross linked are then applied to the control electrodes of the field effect transistors.

In the logic circuits according to the invention, the capac1tors storing the data consist substantially of the barrier layer capacitance of the field effect transistors, the wire-to-ground capacitance and the input capacitance of the next stage.

Referring now to FIG. 1, this circuit is based on MOS field effect transistors with a channel of p-type conductivity. The channel of p-type conductivity is produced by inversion on a semi-conductor surface between two regions of p-type conductivity. Obviously, it is also possible to use MOS field effect transistors with n-type conductivity channels.

FIG. 1 shows a series circuit of three inverter stages 1, 2 and 3. Each inverter stage consists of a basic building block, which comprises a field effect transistor $Q_1$, $Q_2$ or $Q_3$ respectively and a diode $D_1$, $D_2$ or $D_3$ respectively. The diode is preferably formed by a p-n junction but may also consist of a rectifying metal-semi-conductor contact. The diode is connected in series to the controlled current path of the MOS field effect transistor, in such a manner that the diode is conducting when a phase clock pulse of negative voltage is applied to the free electrode of the diode, and to the free electrode of the field effect transistor. The control electrodes of the first field effect transistor receives the input signal A, while the connection between the diode and the field effect transistor is connected to the control electrode of the field effect transistor of the next stage. The output signals occurring at the output electrodes of the individual stages, each of which signals always corresponds to the negated input signal of the preceding stage, may be succeeding processed in further logic circuits. For better understanding, FIG. 1 shows, between the output electrodes of each stage, a ground in dotted lines and charge capacitors $C_1$, $C_2$, $C_3$ respectively which result from the logic interconnections as shown and, therefore, are not required as a separate elements. These capacitors consist of the output capacitance of the basic building block, the input capacitance of the next stage, and the wire-to-ground capacitance.

In the logic circuits according to the invention, a logic 0 corresponds to zero voltage, while a negative voltage is used for forming a logic 1. The input data is supplied to the corresponding input electrodes of the logic interconnection, wherein the signals containing the input data are of longer duration than the phase clock pulses.

Figure 2:
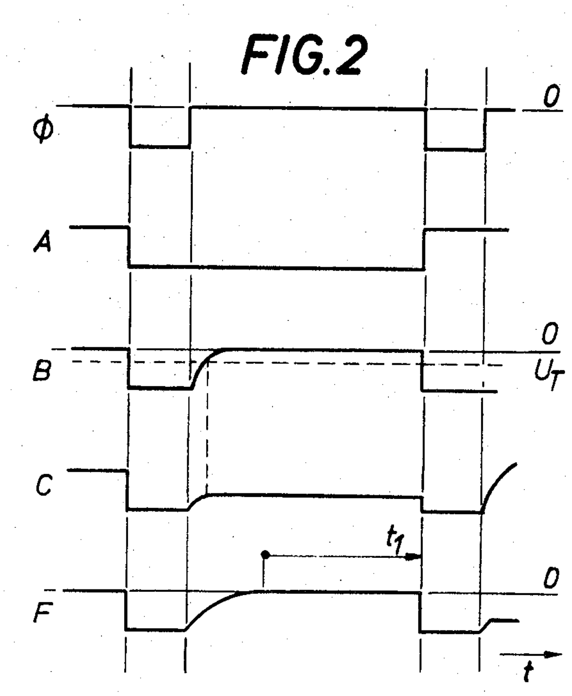
FIG. 2 is a pulse diagram for the circuit of FIG. 1.

The first diagram of FIG. 2 shows the periodically repeated phase clock pulse. The input signal A to be negated is, for example, a logic 1, i.e. a negative voltage pulse, comprising preferably at least the period from the start of a phase clock pulse to the end of the discharging process. All capacitances $C_1$, $C_2$, $C_3$ of all stages are charged during the duration of the phase clock pulses simultaneously through the diodes $D_1$, $D_2$, $D_3$, the transistors $Q_1$, $Q_2$, $Q_3$ or both elements. The output B yields, therefore, a negative voltage during the pulse duration of $\theta$. At the end of the phase clock pulse $\theta$, the input A still receives the negative voltage of the input data, so that the capacitance is discharged through the conducting current path of the field effect transistor $Q_1$. At the end of the phase clock pulse, $C_1$ is again discharged, so that the output B carries between two phase clock pulses the negated input data. It applies that $B = \bar{A}$. FIG. 2 also shows the function at the output B. The capacitance $C_2$ of stage 2 cannot discharge at the same speed as the capacitance $C_1$ of stage 1. This is due to the fact that the discharging resistance of the stages, formed by a field effect transistor, is not constant, but behaves similar to a voltage dependent resistance. Since the control voltage of the transistor $Q_2$, which is identical to the output signal B of the first voltage, declines very quickly after the end of the phase clock pulse, the pass resistance of $Q_2$ rises steeply after the end of the phase clock pulse $\theta$. The capacitance $C_2$ can, therefore, discharge only slowly relative to $C_1$. When the voltage at B has dropped below the threshold voltage $U_T$, the transistor $Q_2$ is blocked and $C_2$ can no longer discharge. $C_2$ therefore maintains a voltage which is above the threshold voltage of the transistor $Q_3$. At the output C of the second stage, there is, therefore, a negative potential between two consecutive clock pulses which still corresponds to a logic 1. The output C, therefore, yields between two phase clock pulses the information $C = \bar{B} = A$.

The transistor of the third stage is conducting owing to the negative voltage applied to the control electrode, so that $C_3$ is relatively quickly discharged through the transistor $Q_3$ between two clock pulses $\theta$. The discharge of $C_3$ proceeds slower than that of $C_1$, because the input-voltage of $Q_3$ is slightly reduced compared to input-voltage of $Q_1$. Therefore a maximal number of stages exists, which may be connected in series. The output F, therefore yields between two phase clock pulses the output information $F = \bar{C} = B = \bar{A}$. The output information may be read out simultaneously in all stages between two phase clock pulses during the time $t_1$.

The inverter function of all stages is also fulfilled if the input A receives a ground potential as data, that is to say a logic 0. During the duration of the phase clock pulse all of the capacitance of all of the stages are charged. However, since the control electrode of stage 1 receives a ground potential, $C_1$ can no longer discharge after the end of $\theta$. At the output B, there is, therefore, a negative voltage between two phase clock pulses, so that $C_2$ is quickly discharged after the end of $\theta$ through the conducting transistor $Q_2$. The output C yields, therefore, a ground potential between two phase clock pulses. $C_3$ cannot discharge as quickly as $C_2$ owing to the voltage dependent resistance of $Q_2$, so that in view of the function described above the output F carries negative voltage and, therefore, a logic 1.

Thus, the operation of the logic interconnection according to the invention consists substantially in charging all capacitances of all stages simultaneously by a phase clock pulse, but during the discharging of the stages the non-linearity of the elements has the effect that the correct output data can be read without delay between the clock pulses simultaneously in all stages.

Figure 3A:
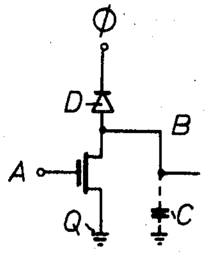
FIG. 3*a* shows the circuit diagram of a basic building block stage from which logical interconnections in accordance with the invention can be built up.
Figure 3B:
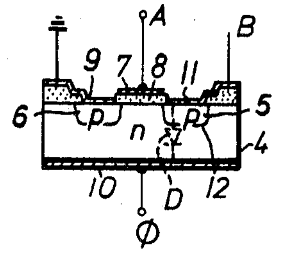
FIG. 3*b* is a sectional view of a suitable physical construction of the circuit of FIG. 3*a;*

FIG. 3 shows by way of example embodiments for realising an inverter stage by integrated techniques. The inverter stage of FIG. 3*a* consists of the elements already explained with reference to FIG. 1. However, in this circuit the free electrode of the field effect transistor Q is grounded. FIG. 3*b* shows a semiconductor body 4, consisting, for example, of silicon with n-conductivity. Two regions 5 and 6 of p-type conductivity were diffused into the semi-conductor body from one side at a certain distance from each other and form the positive and negative electrodes of the field effect transistor. Between these two regions, a channel is formed if a voltage of suitable polarity is applied to the control electrode 7 formed on an insulating layer 8 above the channel. The electrode, which 9, which is connected to the region 6, is grounded is earthed. The surface of the semi-conductor body, which is remote from the semi-conductor regions 5 and 6, is provided with a barrier layer contact 10 to which the phase clock pulse is applied. This phase clock pulse $\theta$ passes through a p-n junction 12 to the connecting electrode 11 of the p-region 5, which is identical to the output electrode B. The diode D in FIG. 3*a* is, therefore, realized by the diode between the substrate and the electrode 11. The diode D is shown in FIG. 3*b* by dotted lines.

Figure 4:
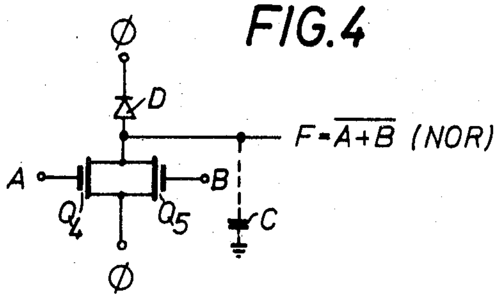
FIG. 4 shows the circuit diagram of a negated or interconnection.
Figure 5:
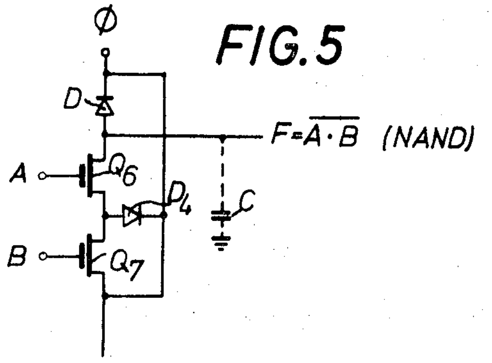
FIG. 5 shows the circuit diagram of a negated AND interconnection.

FIG. 4 shows a negated OR or NOR interconnection, while FIG. 5 indicates a negated AND or NAND interconnection. These circuits, in which field effect transistors are connected either in parallel or in series, may also be interconnected to form mixed interconnection of known construction from AND and OR circuits. The circuits shown in FIGS. 4 and 5 or other modified circuits may be connected in series, maintaining the described advantages in the same way as the inverter stages of FIG. 1. Naturally, in order to realize any required logic functions it is also possible to connect in series, as required, NOR gates with NAND gates, inverter gates or other gates. Even in these complex arrangements, all stages are connected simultaneously to the phase clock pulse, so that all capacitances are charged simultaneously The differential time constant during the discharging of the capacitances in the individual stages maintains the function of all individual stages.

The composition of the capacitances of the stages has already been described. These are voltage-dependent capacitances, in which the voltage dependence is caused substantially by the barrier layer capacitance. The capacitance values of the barrier layer capacitances increase quickly with dropping voltage. This means that the discharge time becomes longer with low voltages. This may reduce the differential time constant in an undesirable manner.

However, in addition to the barrier layer capacitance the capacitance also comprises the input capacitance of the next stage and wire-to-earth capacitances. The last mentioned capacitances are substantially fixed capacitances. In order to obtain a differential time constant of the desired magnitude it is necessary that the barrier layer capacitances should be as small as possible compared with the fixed capacitances.

Naturally, the MOS field effect transistors may also be replaced by other suitable active elements.

It should also be stressed that the individual circuits connected in series may be linked with other individual circuits which may be connected in parallel to one or more individual circuits.

It will be understood that the above description of the present invention is susceptible to various modification changes and adaptations.

What is claimed is:

1. A dynamic logic interconnection comprising: a plurality of individual logic circuits connected in series, each of said individual logic circuits including a diode element and a field effect transistor which has a control electrode and first and second main electrodes forming a controlled current path of said transistor; said diode having one electrode connected to said first electrode; means connected for applying a single phase clock pulse to the other electrode of said diode of each of said logic circuits; means connected for applying input data to said control electrode; and, means connecting the connecting point between said diode and said first electrode of one of said individual circuits to the control electrode of the field effect transistor of the following one of said individual circuits.

2. An interconnection as defined in claim 1, further comprising means for applying said single phase clock pulse to said second electrode of said field effect transistor.

3. An interconnection as defined in claim 1, further comprising means for grounding said second electrode of said field effect transistor.

4. A interconnection as defined in claim 1, wherein said field effect transistor comprises a MOS field effect transistor with an insulated control electrode.

5. An interconnection as defined in claim 1, wherein said individual circuits further comprise a further field effect transistor having its controlled current path connected in series with said field effect transistor and means are provided for applying separate input data to the control electrodes of said field effect transistors so that an AND or a NAND gate is produced.

6. An interconnection as defined in claim 1, wherein said individual circuits further comprise a further field effect transistor having its controlled current path in parallel with said controlled current path of said field effect transistor and means for applying separate input data to the control electrodes of said field effect transistors so that an OR or NOR gate is produced.

7. An interconnection as defined in claim 1, wherein the diode of each said individual circuit comprises a barrier layer junction between a substrate containing said individual circuit and said first and second electrodes respectively of said field effect transistor.

8. An interconnection as defined in claim 1, wherein said clock pulse applying means applies pulses which are shorter than pulses applied by said data input applying means.

9. An interconnection as defined in claim 1, wherein said individual circuits further comprise a capacitance for storing data and substantially consisting of a barrier layer capacitance of said field effect transistor, the output capacitance of the next said individual circuit and wire-to-ground capacitances.

* * * * *